United States Patent
Kim et al.

[11] Patent Number: 5,881,674
[45] Date of Patent: Mar. 16, 1999

[54] PROCESS FOR PREPARING THE INTERIOR SURFACES OF AN AQUARIUM WITH DEBRIS-REPELLENT PROPERTIES

[76] Inventors: Hee Jung Kim, 221-1 Hyonsung-Dong, Gaeyang-Gu, Inchon City; Sang Chul Park, #101, Banposadong 612-31, Seochogu, Seoul; Myoung Soo Shin, Shin Dong Bang, Ltd., 4 Ga 2, YongPyung-Dong, Youngdongpo-Gu, Seoul, all of Rep. of Korea

[21] Appl. No.: 24,907

[22] Filed: Feb. 17, 1998

[51] Int. Cl.$^6$ ................................................. A01K 63/00
[52] U.S. Cl. ........................... 119/245; 119/264; 250/526
[58] Field of Search .................................. 119/267, 266, 119/264, 200, 215, 233; 134/1; 204/15; 250/526

[56] References Cited

U.S. PATENT DOCUMENTS

| | | | |
|---|---|---|---|
| 3,752,747 | 8/1973 | Treharne et al. | 204/149 |
| 4,571,727 | 2/1986 | Nishizawa et al. | 372/4 |
| 5,148,772 | 9/1992 | Kirschbaum | 119/245 |
| 5,199,378 | 4/1993 | Kissick, Jr. et al. | 119/264 |
| 5,240,596 | 8/1993 | Chestnut | 210/136 |

*Primary Examiner*—Michael J. Carone
*Assistant Examiner*—Judith A. Nelson

[57] ABSTRACT

A process for preparing the interior surfaces of aquariums with debris-repellant properties, comprising the irradiation of a surface by far infrared light, thereby inducing an electron deficiency upon the surface. Dirt particles are repelled by the positively charged surface, since most dust particles have positively charged centers. The negatively charged periphery of said dust particles adhere to the positively charged surface, but the attractive forces between the surface and the dirt particles are too weak to overcome gravitational forces which cause the particles to fall off or float away from the surface. In addition, the electron deficiency on the inner surface of the aquarium drives a surface reaction which produces oxygen. This evolving of gas from the inner surface further repels the adherence of debris particles and provides a healthy atmosphere for fish dwelling in the aquarium. Further, specially prepared water used in conjunction with the tank further contributes to the debris-repellant properties of the inner surface of the aquarium.

4 Claims, 2 Drawing Sheets

5,881,674

PROCESS FOR PREPARING THE INTERIOR SURFACES OF AN AQUARIUM WITH DEBRIS-REPELLENT PROPERTIES

BACKGROUND OF THE INVENTION

1. Field of the Invention

The present invention generally pertains to the field of debris repellants and other cleaning agents, and specifically to a process for the preparation of the inner surfaces of an aquarium with debris repellant properties.

2. Description of the Prior Art

Debris accumulates on the inside surfaces of aquariums. This may include dirt particles, fish feces, and various forms of algae. Any part of the inside surfaces of an aquarium exposed to water is likely to collect such debris within a given period of time. Cleaning the surfaces often involves emptying the aquarium of its existing water and scrubbing the surfaces with a sponge soaked in a cleaning agent. Care must be taken that the glass, plexi-glass, or other clear surface is not scratched or damaged in the cleaning process.

It is commonly known that dirt particles in water are often charged electrically, with a positive charge at the center of the particle, and negative charges towards the ends of the particle, due to the high electron density along the ends of the particle. This amounts to an attractive force between debris and surfaces.

Accordingly, the primary object of the present invention is to provide a process for preparing the interior surfaces of an aquarium with debris repellant properties.

SUMMARY OF THE INVENTION

The present invention comprises the irradiation of surfaces by far infrared light, producing an electron deficiency on the irradiated surfaces. Because most dirt particles are irregularly shaped and adhere to surfaces by their central positive charge, the electron deficient irradiated surfaces repel such dirt particles. The ends of the particles are negatively charged. In the event of contact between a dirt particle and a vertical surface under water, since only the ends of the particles are negatively charged, they cannot support the weight of the dirt particle; the attraction cannot overcome gravitational forces; the particle falls or floats out of contact with the vertical surface.

In addition, the electron deficiency caused by this irradiation drives a surface reaction upon the surface of the aquarium which produces water and oxygen as products, thereby providing additional oxygen for the fish within the tank. In addition, the oxygen generated on the surface of the aquarium contributes additional cleaning properties because the evolving of gas on the surface prevents particles from adhering to the surface.

Further, a specially prepared water taught by the present invention is used within the aquarium to further enhance the debris-repellant properties of the inner surfaces of the aquarium. The water used in this invention is electrolyzed and irradiated by far infrared light, thereby producing a final product that is useful in keeping the inner surface of the aquarium clean when used in conjunction with the aquarium taught by the present invention.

These together with other objects of the invention, explained clearly in the claims annexed to and forming a part of this disclosure. For a better understanding of the invention, its operating advantages and the specific objects attained by its use, reference should be made to the accompanying drawings and descriptive matter in which there are illustrated preferred embodiments of the invention.

BRIEF DESCRIPTION OF THE DRAWINGS

For a better understanding of the principle and nature of the present invention, reference should be made to the following detailed description taken in connection with the accompanying drawings in which.

DETAILED DESCRIPTION OF THE PREFERRED EMBODIMENT

Figure 2:
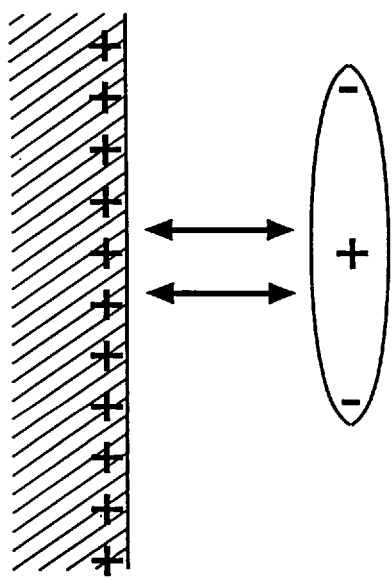
FIG. 2 depicts the manner in which a vertical surface prepared in the manner taught be the present invention repels a vertically oriented debris particle.

The present invention comprises the irradiation of a surface by far infrared light. This irradiation induces an electron deficiency on the surfaces, or a permanent positive static charge. Referring to FIG. 2, debris particles, usually having a positive central charge and negative charges along the periphery of the particle, are repelled from such surfaces because of the positive—positive charges repelling each other.

Figure 1:
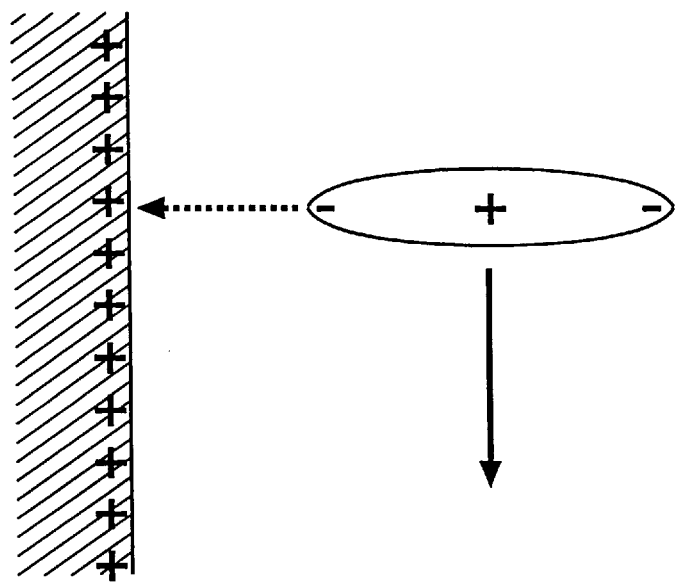
FIG. 1 depicts the manner in which a vertical surface prepared in the manner taught be the present invention repels a horizontally oriented debris particle.
Figure 3:
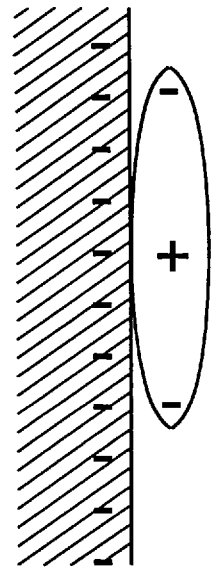
FIG. 3 depicts the manner in which debris adheres to a vertical surface.

Referring to FIG. 1, in the event that the negatively charged periphery of the debris particle is attracted to the positively charged surface, the attractive forces between the periphery and the surface (depicted as a dotted line) cannot overcome gravitational forces (depicted as a solid line), since the negative charge lies only along the periphery of the debris particle. FIG. 3 depicts the manner in which debris adheres to negatively charged surfaces, showing that an induced electron deficiency is necessary in order to repel debris.

In addition, the exposure of the interior surface of the aquarium by far infrared light yields an electron deficiency which becomes the driving force of the following reaction:

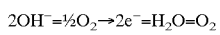

$$2OH^- = \tfrac{1}{2}O_2 \rightarrow 2e^- = H_2O = O_2$$

Therefore, this irradiation of far infrared light induces an electron deficiency on the inner surface of the aquarium, thereby driving the above surface reaction which produces more oxygen. Additional oxygen is beneficial to the health of the fish within the aquarium.

Figure 4:
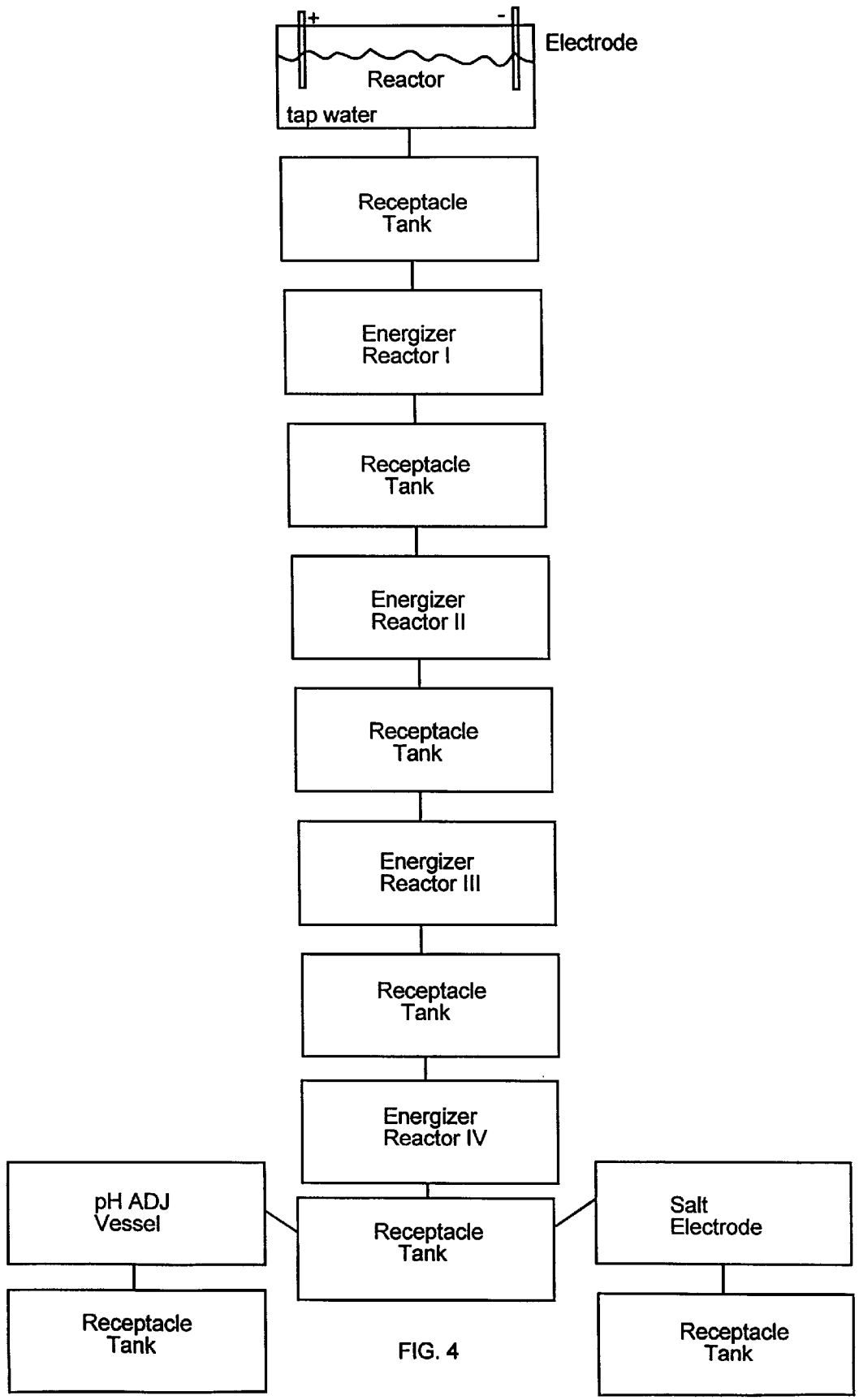
FIG. 4 depicts the manner in which the special water particular to the present invention is prepared.

Referring to FIG. 4, the water used in the aquarium is specially prepared in the following manner. The preparation of the water comprises a multi-step process that further comprises a plurality of batch processes, wherein the product yielded from a step in the overall process is then successively used as the feed for the subsequent batch process.

The first batch process involves the passage of an electrical current through water. The water used is preferably filtered and is without electrolytes or contaminants, so as to maximize the oxygen content within the water, as water with dissolved contaminants like salt is unable to be fully saturated with oxygen. The voltage of the current is preferably between 50 and 100 volts. The process may use multiple cathodic and anodic leads, so as to maximize the effects of the current. In addition, stirrers may be employed in the reaction as well in order to ensure exposure to the entire solution.

The second batch process comprises an energizing reactor that comprises a batch process tank reactor with several far infrared light emitters. These emitters are positioned along the tank so as to maximize exposure to the water. The effluent yielded from the first batch process is then fed into the energizer reactor where the water is irradiated with far infrared light by the emitters. A plurality of these energizer reactors are placed in series, wherein the effluent from one energizer reactor serves as the feed for the subsequent energizer reactor down the process chain.

Effluent from the fourth energizer reactor may be fed to a pH adjusting vessel wherein the solution is introduced to basic or acidic compounds in order to reduce adjust the pH of the solution. Effluent from the fourth energizer reactor may also be fed into a reactor with an active salt electrode.

What is claimed as being and therefore desired to be protected by Letters Patent of the United States is the following:

1. A process for preparing the interior surfaces of aquariums with debris repellant properties comprising the irradiation of a surface by far infrared light, thereby inducing an electron deficiency upon said surface, wherein debris particles are repelled by said electron deficiency upon said surface.

2. A process for preparing the interior surfaces of aquariums with debris repellant properties as mentioned in claim 1, wherein the water used in said aquarium is prepared by:
   a) filtering said water;
   b) electrolyzing said water using a cathode and anode, and a current of voltage ranging between 50 to 100 volts;
   c) irradiating said water by far infrared light.

3. A process for preparing the interior surfaces of aquariums with debris repellant properties comprising the irradiation of a surface by far infrared light of varying wavelengths, thereby inducing an electron deficiency upon said surface, wherein dirt particles are repelled by said electron deficiency upon said surface.

4. A process for preparing the interior surfaces of aquariums with debris repellant properties as mentioned in claim 3, wherein the water used in said aquarium is prepared by:
   a) filtering said water;
   b) electrolyzing said water using a cathode and anode, and a current of voltage ranging between 50 to 100 volts;
   c) irradiating said water by far infrared light.

* * * * *